United States Patent
Tamm (10) Patent No.: US 9,022,838 B2
(45) Date of Patent: May 5, 2015

(54) ASSEMBLY FOR GRINDING ELECTRODES

(76) Inventor: Rolf Tamm, Salem (DE)

(*) Notice: Subject to any disclaimer, the term of this patent is extended or adjusted under 35 U.S.C. 154(b) by 191 days.

(21) Appl. No.: 13/558,520

(22) Filed: Jul. 26, 2012

(65) Prior Publication Data

US 2013/0029568 A1    Jan. 31, 2013

(30) Foreign Application Priority Data

Jul. 28, 2011  (DE) .................. 10 2011 052 247

(51) Int. Cl.
*B24B 19/00* (2006.01)
*B24B 19/16* (2006.01)
*B23K 11/30* (2006.01)

(52) U.S. Cl.
CPC ............. *B24B 19/16* (2013.01); *B23K 11/3063* (2013.01)

(58) Field of Classification Search
CPC ...... B24B 19/16; B24B 55/10; B24B 55/102; B24D 7/02; B24D 7/14; B23K 11/3063
USPC ........... 451/41, 282, 283, 285, 287, 290, 359, 451/405, 410, 294
See application file for complete search history.

(56) References Cited

U.S. PATENT DOCUMENTS

| | | | | |
|---|---|---|---|---|
| 3,673,744 A | * | 7/1972 | Oimoen ......................... | 451/353 |
| 3,802,130 A | * | 4/1974 | Lindenbeck ................... | 451/544 |
| 3,882,644 A | * | 5/1975 | Cusumano .................... | 451/359 |
| 4,768,309 A | * | 9/1988 | Miller ........................... | 451/282 |
| 4,788,797 A | * | 12/1988 | Kane et al. .................... | 451/344 |
| 4,951,423 A | * | 8/1990 | Johnson ........................ | 451/526 |
| 5,125,190 A | * | 6/1992 | Buser et al. ................... | 451/456 |
| 5,261,190 A | * | 11/1993 | Berger et al. ................. | 451/357 |
| 5,313,742 A |  | 5/1994 | Corcoran et al. | |
| 5,411,433 A | * | 5/1995 | Keller .......................... | 451/451 |
| 6,106,203 A | * | 8/2000 | Asmis et al. .................. | 409/137 |
| 6,106,372 A | * | 8/2000 | Clark ............................ | 451/56 |
| 6,645,055 B1 | * | 11/2003 | Olsen ........................... | 451/259 |
| 6,752,702 B1 | * | 6/2004 | Thompson et al. ........... | 451/177 |
| 6,918,823 B2 | * | 7/2005 | Tamm ............................ | 451/65 |
| 7,488,239 B2 |  | 2/2009 | Tamm | |
| 2002/0094769 A1 | * | 7/2002 | Lai et al. ...................... | 451/358 |
| 2004/0127149 A1 | * | 7/2004 | Tamm ............................ | 451/65 |

(Continued)

FOREIGN PATENT DOCUMENTS

| | | |
|---|---|---|
| DE | 66 00 540 U | 9/1968 |
| DE | 100 10 520 A1 | 9/2001 |

(Continued)

OTHER PUBLICATIONS

DE 100 10 520 English Translation, attached as pdf.*

*Primary Examiner* — Joseph J Hail
*Assistant Examiner* — Brian Keller
(74) *Attorney, Agent, or Firm* — Lazaris IP (57) ABSTRACT

A device for processing welding electrodes with a grinding surface driven by a driving motor with a shaft, which faces the motor and runs in a housing, wherein at least one opening is provided in the housing for guiding a welding electrode for grinding in a defined position relative to the grinding wheel. The housing is releasably fixed to a motor flange for bearing the shaft, and the grinding wheel is arranged on a side of the motor flange which is remote from the motor. The motor flange is formed by a sleeve, which is adapted to be stuck onto the housing in such a way, that at least one opening extends from the circumference of the housing towards the grinding surface facing the motor.

7 Claims, 5 Drawing Sheets

(56) References Cited

U.S. PATENT DOCUMENTS

| | | | |
|---|---|---|---|
| 2008/0108284 A1* | 5/2008 | Tamm | 451/282 |
| 2008/0214095 A1* | 9/2008 | Dovel et al. | 451/65 |
| 2012/0289130 A1* | 11/2012 | Tamm | 451/363 |
| 2013/0288580 A1* | 10/2013 | Tamm | 451/363 |
| 2014/0024300 A1* | 1/2014 | Dovel et al. | 451/282 |

FOREIGN PATENT DOCUMENTS

| | | |
|---|---|---|
| DE | 000010010520 A1 | 9/2001 |
| DE | 100 66 073 A1 | 8/2002 |
| DE | 000010066071 A1 | 8/2002 |
| DE | 000010066073 A1 | 8/2002 |
| DE | 000010010520 C2 | 11/2002 |
| DE | 000010066071 C2 | 11/2002 |
| DE | 000010066073 C2 | 11/2002 |
| DE | 000010112930 C1 | 11/2002 |
| DE | 102 08 914 A1 | 9/2003 |
| DE | 000010208914 A1 | 9/2003 |
| DE | 102 10 069 A1 | 10/2003 |
| DE | 000010210069 A1 | 10/2003 |
| DE | 102 43 210 B3 | 5/2004 |
| DE | 000010243210 B3 | 5/2004 |
| DE | 000010208914 B4 | 9/2005 |
| DE | 10 2006 052 904 A1 | 5/2008 |
| DE | 10 2006 052905 A1 | 5/2008 |
| DE | 102006052904 A1 | 5/2008 |
| DE | 102006052905 A1 | 5/2008 |
| DE | 000010210069 B4 | 11/2009 |
| DE | 10 2009 044860 B3 | 4/2011 |
| DE | 102009044860 B3 | 4/2011 |
| DE | 102006052905 B4 | 5/2011 |
| DE | 102009044855 A1 | 6/2011 |
| DE | 102009044857 A1 | 6/2011 |
| DE | 102009057490 A1 | 6/2011 |
| DE | 102006052904 B4 | 7/2011 |
| GB | 2 452 575 A | 3/2009 |
| WO | 2011069718 A1 | 6/2011 |
| WO | 2011069720 A1 | 6/2011 |
| WO | 2011069727 A1 | 6/2011 |
| WO | WO 2011069719 | 6/2011 |

* cited by examiner

ASSEMBLY FOR GRINDING ELECTRODES

CROSS REFERENCE TO RELATED PATENT APPLICATIONS

To the fullest extent permitted by law, this nonprovisional utility patent application claims priority under 35 U.S.C. §119 to Germany Patent Application No. 10 2011 052 247.6, with a filing date of Jul. 28, 2011.

STATEMENT REGARDING FEDERALLY-SPONSORED RESEARCH OR DEVELOPMENT

Not applicable.

FIELD OF THE INVENTION

The invention relates to a device for processing welding electrodes with a grinding surface driven by a driving motor with a shaft, which faces the motor and runs in a housing, wherein (a) at least one opening is provided in the housing for guiding a welding electrode for grinding in a defined position relative to the grinding wheel, (b) the housing is releasably fixed to a motor flange for bearing the shaft, and (c) the grinding wheel is arranged on a side of the motor flange which is remote from the motor.

The openings may be bore holes. Welding electrodes consist of a very hard and high-temperature resistant material, such as tungsten. There are welding electrodes with different cross sections. The welding electrodes have a tip or edge at one end. The shape of the welding electrode depends on its application. The tips of the welding electrodes wear out during operation.

Welding electrodes can be bought without shaping or with a ready-made tip. After use the tip or the shape becomes worn out. The welding electrodes are then reshaped or disposed of. Due to the precious material this is expensive.

BACKGROUND OF THE INVENTION

It is known to grind electrodes. This is commonly effected manually with open grinding or separating wheels. Such methods are imprecise and dangerous. Furthermore, there are devices with open grinding wheels where the welding electrodes are guided through a guiding sleeve with a certain angle relative to the grinding wheel. Such devices are also expensive. In particular, it is expensive to adapt such a device to various types of welding electrodes or for different tips or cutting shapes. In particular, this requires a time-consuming exchange of the guiding sleeves.

A device where electrodes can be produced with a plurality (for example 6) of different electrode diameters with a plurality of different tip angles (for example 4) with many lengths is a valuable, cost-saving aid.

DE 100 10 520 A1 discloses a device for grinding welding electrodes with a grinding wheel. The grinding wheel rotates in a grinding wheel housing. The device is provided with an additional housing portion which is adapted to be fixed to the grinding wheel housing and which is provided with at least one opening for guiding a welding electrode for grinding in a defined position relative to the grinding wheel. The plane of the grinding wheel is essentially the separating plane between the grinding wheel housing and the additional housing portion. The additional housing portion can be provided with a plurality of adjacent, different openings for receiving different kinds of welding electrodes. The additional housing portion can, however, also be provided with a plurality of adjacent openings having an axis cutting the plane of the grinding wheel under different angles. A radial slit can be formed in the grinding wheel housing extending along the front end of the housing, which is used to pass a welding electrode for cutting at the outer perimeter of the grinding wheel. The grinding wheel of the disclosed device is fixed to a grinding wheel reception which in turn is connected to a driving shaft of a driving motor. The entire device forms a portable unit.

DE 102 43 210 B3 discloses an assembly where two parallel grinding wheels with different grain sizes are used. A first grinding wheel rotates in a space between the motor unit and a first housing portion. The second grinding wheel rotates in a second space between the first housing portion and the second housing portion. The housing portions are provided with openings for guiding the welding electrodes. The known assembly enables the use of different grinding wheels with standard diameters without the need of an exchange.

Further to a motor in a motor unit the assembly makes use of further housing portions: a motor flange directly screwed to the motor unit and at least one housing portion provided with openings for guiding the electrodes. The openings extend from the side of the housing portion opposite to the motor in the direction of the grinding wheel rotating between the motor flange and the housing portion. Depending on the amount of grinding wheels further housing portions are added. Here also the openings extend from the side opposite the motor. In other words: The electrodes are always inserted into the openings in a direction towards the motor. Depending on the amount of housing portions the assembly is relatively long and requires a long driving shaft. Several fixing elements, such as screws, nuts, pins etc. are required for fixing the housing portions.

DE 10 2006 052 905 A1 discloses a device for grinding electrodes where the opening is provided in a housing portion which is directly connected to the motor housing and the grinding wheel is provided at the side of the housing portion remote from the motor, and wherein the opening extends from the circumference of the housing portion towards the grinding wheel. The first housing portion which is provided with openings also serves as motor flange and is directly provided at the motor housing. The electrodes are inserted away from the motor into the openings. The grinding wheel is positioned on the side remote from the motor. With such an assembly, the assembly is shorter by the length of one component. The assembly requires less housing portions and fixing components and the shafts can be shorter. Thereby, the risk of undulating of the shaft is reduced.

It is disadvantageous, however, with the use of the motor flange as a housing portion for the bore holes that it is difficult to be exchanged. The bearing for the motor shaft is arranged in this component. If a bore hole has defects and the motor flange must be exchanged the bearing must also be exchanged. For this purpose the motor must be disassembled and newly balanced. This is time consuming. Usually, the device is sent to the manufacturer for the exchange of the motor flange. Then, the device is not available for the user in the meantime.

BRIEF SUMMARY OF THE INVENTION

It is an object of the invention to provide a device of the above mentioned kind, which facilitates the exchange and maintenance of the motor-side openings.

According to the invention this object is achieved in that the motor flange is formed by a sleeve, which is adapted to be stuck onto the housing in such a way, that at least one opening extends from the circumference of the housing towards the grinding surface facing the motor. The openings can be bore holes.

The assembly has several advantages. The length of the assembly is small as the housing is stuck onto the sleeve beyond the grinding wheel. Bore holes can extend in the same housing from the motor side and from the opposite side remote from the motor in the direction of the grinding wheel. The bore holes are all provided in a common housing which can be easily removed from the sleeve and replaced or serviced. Contrary to the known assembly where the motor side of the grinding wheel is inserted, the sleeve has no bore holes anymore. If, therefore, an opening is defective the housing with the bore holes is released and replaced or serviced. The sleeve itself remains fixed to the motor housing thereby leaving the bearing of the shaft untouched.

According to a modification of the present invention the sleeve may have a flange for fixing to the flange of the motor housing. Otherwise, the sleeve may be cylindrical. The cylindrical portion may extend coaxially with the shaft. Preferably, the end of the cylindrical portion which is remote to the motor is conical.

Preferably, threaded bore holes are provided in the range of the flange on the side remote from the motor for screws to fix the housing and/or a protective cover. Instead of a threaded bore hole a receptacle for a nut is also suitable. The nut is accommodated in such receptacle and cannot be rotated. The screw is then screwed to the nut for fixing the housing and/or a protective cover. The fact that it is not rotatable enables to fix the housing and/or protective cover with only one screw. By suitable positioning of the nut in the receptacle a desired lateral shift of the housing against the sleeve can be achieved.

However, a further pin can be provided along the circumference on the upper side of the sleeve engaging in a bore hole on the underside of the housing and/or protective cover. Thereby, it is also ensured that the connection cannot be rotated.

Preferably, a further grinding surface runs in the housing, which is directed to the side remote from the motor, and the housing comprises at least one further opening extending from the circumference of the housing towards the grinding surface directed to the side remote from the motor. Thereby, two grinding surfaces can be used. This is particularly useful, if a different grain size shall be used.

The grinding surfaces may form opposite sides of one grinding wheel or may be provided on different grinding wheels rotating about the same axis and directed in opposite directions.

Preferably, the housing can be fixed to the sleeve in different lateral positions relative to the rotational axis of the shaft. Thereby, different ranges of the grinding surface are used.

In a further modification of the invention a protective cover with a suction device is provided for fixing to the housing. It is particularly advantageous if the position of the protective cover is adapted to the lateral position of the housing. Preferably, the protective cover is connected to the housing. When the housing is laterally shifted the protective cover is also shifted as it is connected to the housing and not to the motor flange.

In a further embodiment of the invention an angular fitting is provided for fixing the device to a table or a bench vise. Otherwise the device is a hand held device.

Further modifications of the invention are subject matter of the dependent claims. An embodiment is described below in greater detail with reference to the accompanying drawings.

BRIEF DESCRIPTION OF THE SEVERAL VIEWS OF THE DRAWINGS

In the following, the invention is described in more detail on the basis of preferred embodiments with reference to the accompanying figures. The figures show.

DETAILED DESCRIPTION OF THE INVENTION

In the drawings, numeral 10 generally designates a device for grinding welding electrodes made of tungsten. The device 10 comprises a motor with a motor housing 12, a motor flange 14 screwed to the motor housing 12 and a cylindrical housing portion 16 set on the motor flange 14. The housing portion 16 is connected to the motor and the motor flange in a way described below.

A grinding wheel assembly 18 with two grinding wheels 20 and 22 having different grain size rotates in a plane 19 inside the housing portion 16. The grinding wheel assembly 18 comprises a grinding wheel 20 with large grain size and a grinding wheel 22 with small grain size which is otherwise the same.

Figure 1:
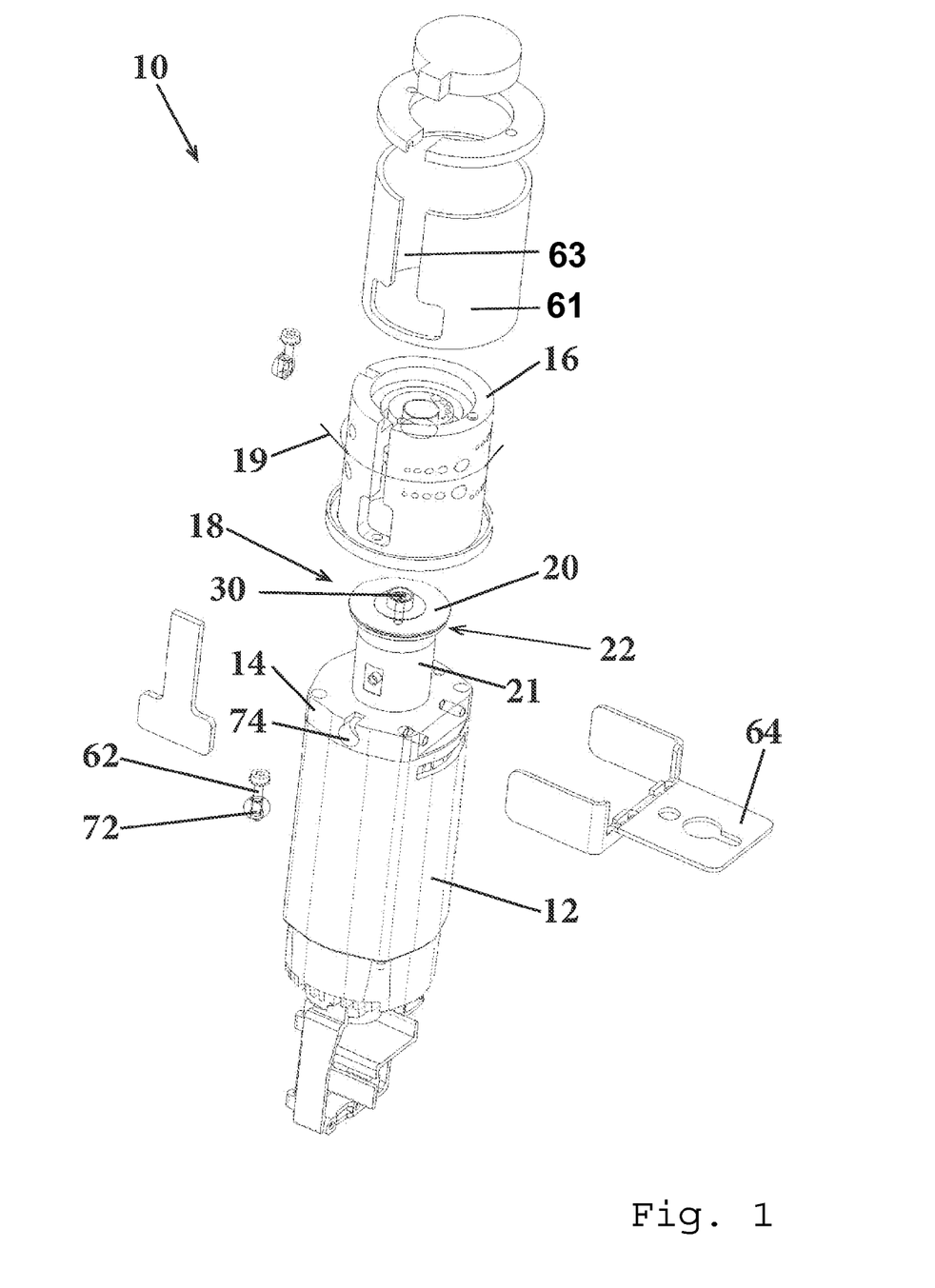
FIG. 1 is an explosive view of a device for grinding welding electrodes with several grinding surfaces and a housing portion with several openings for guiding electrodes which is adapted to be set on a motor flange having the form of a sleeve.
Figure 2:
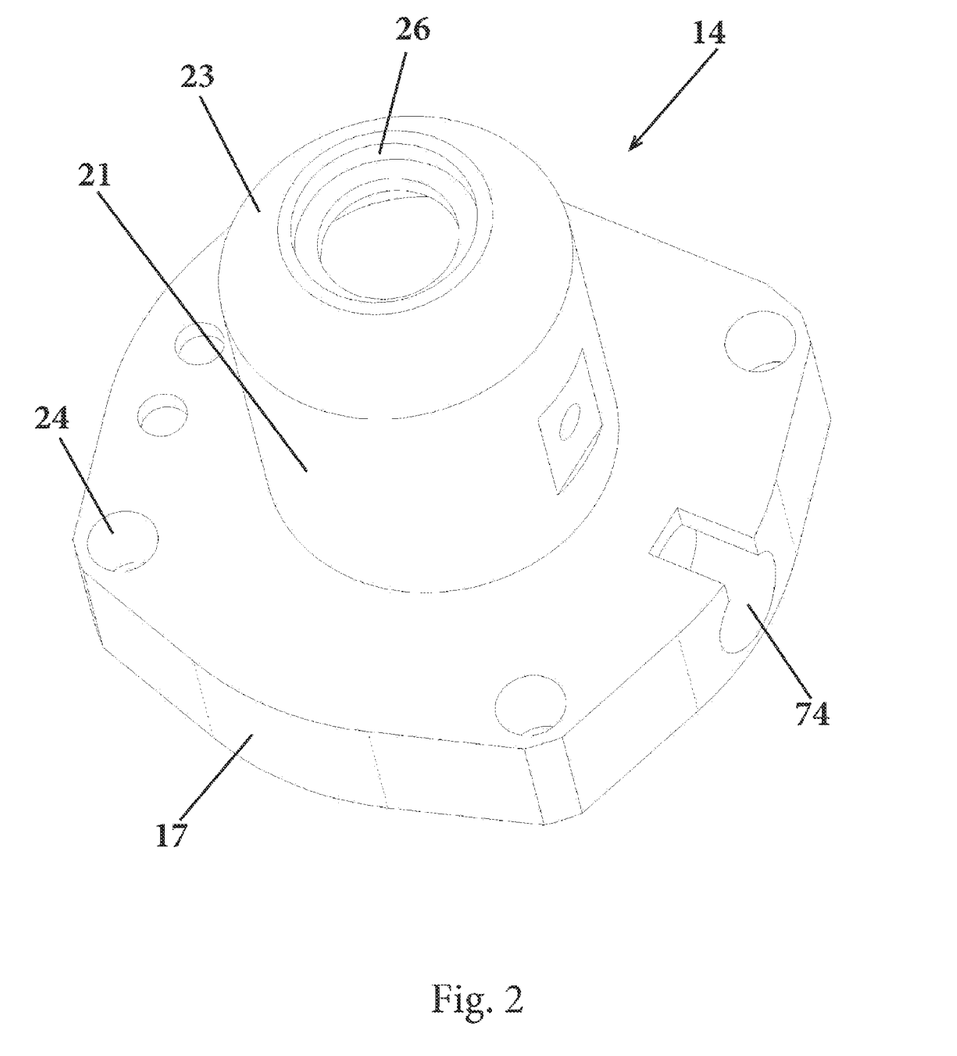
FIG. 2 is a perspective view of the motor flange in the form of a sleeve in greater detail.

The motor flange 14 is separately shown in FIG. 2. The flange is provided with four bore holes 24. Through these bore holes the flange is screwed to the motor housing 12 in the way shown in FIG. 1.

A disc-shaped recess 26 is provided in the end of the motor flange 14 which is remote from the motor. This recess 26 serves to accommodate the grinding wheel assembly 18. A shaft 30 used to screw the grinding wheel assembly 18 to the motor is simultaneously the motor shaft. The shaft 30 is tightly connected to the grinding wheel assembly 18.

The motor flange has a larger cross section in the range 17 facing the motor housing 12 corresponding to the cross section of the motor housing 12. On the side of the motor flange opposite to the motor housing 12 the motor flange forms a cylindrical sleeve 21. The cylindrical sleeve 21 coaxially extends around the shaft 30. The end 23 of the sleeve 21 is conical.

If the grinding wheel assembly 18 with the shaft 30 is inserted the essentially cylindrical housing portion 16 is coaxially set on the motor flange 14. The housing portion 16 will then entirely enclose the sleeve 21. The grinding wheel assembly 18 runs in the range of the plane 19 inside the housing portion 16.

Figure 3:
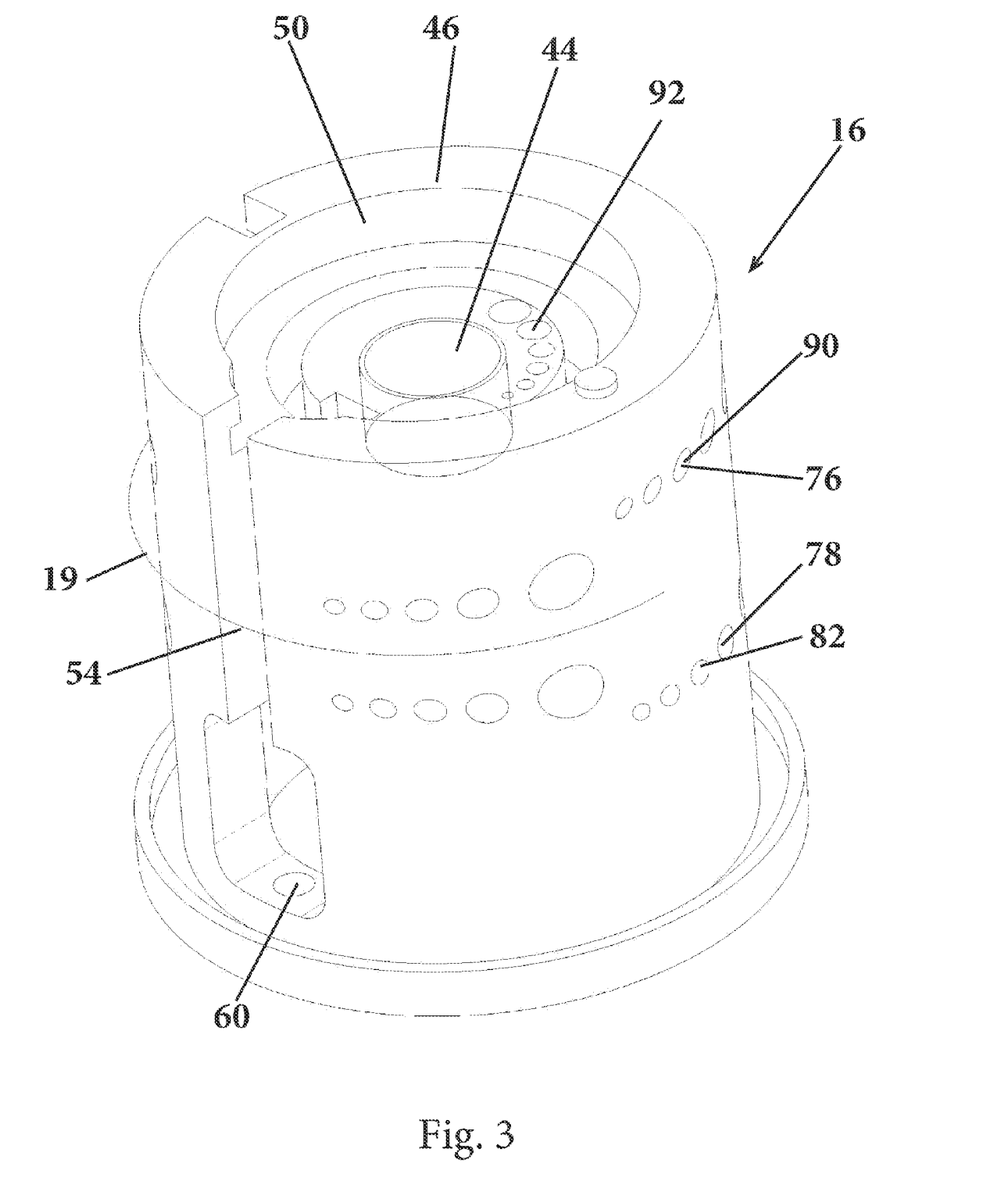
FIG. 3 is a perspective view of the housing portion with several openings for guiding electrodes in greater detail.
Figure 4:
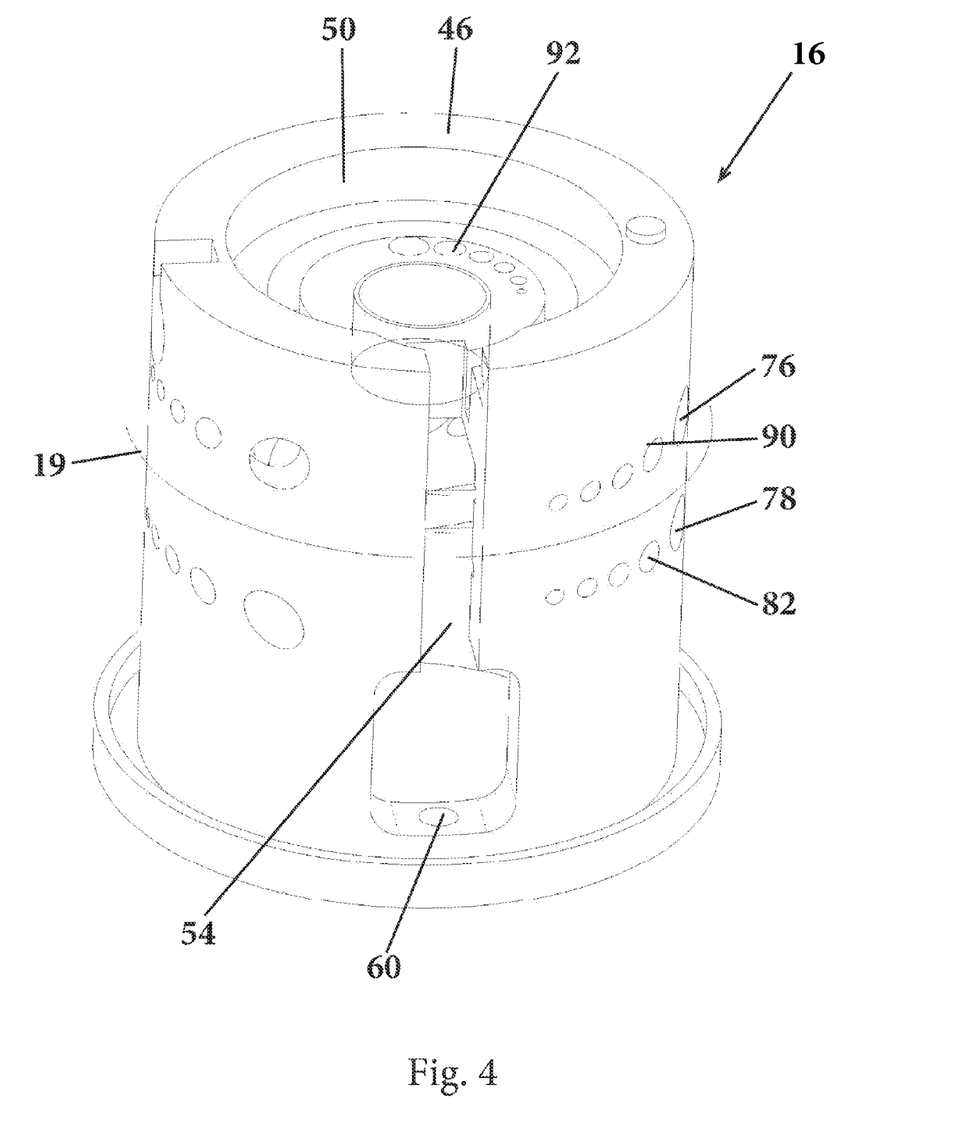
FIG. 4 is a perspective view of the housing flange of FIG. 3 from a different view.
Figure 5:
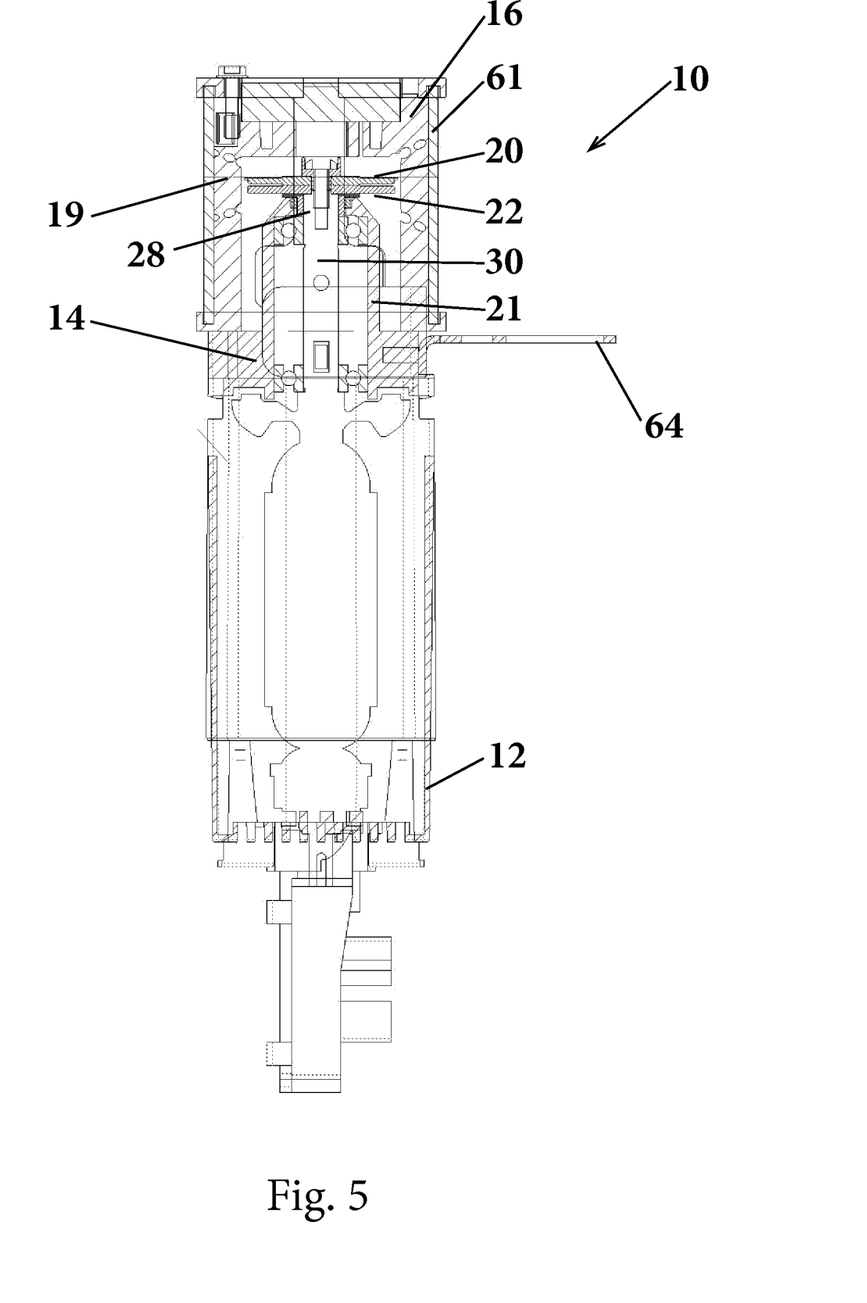
FIG. 5 is a cross sectional view of the assembled device of FIG. 1.

The housing portion 16 is shown in greater detail in FIG. 3 and FIG. 4. The housing portion 16 is provided with a center bore hole 44. The center bore hole 44 is aligned with the bore holes of the grinding wheel assembly 18 and the rotational axis of the shaft 30. A recess 50 is provided around the bore hole on the plane surface 46. Furthermore, the housing is provided with a longitudinal slit 54 in a radial direction extending along the entire thickness of the housing. The slit 54 is wide enough to insert the electrodes therein. When the grinding wheel assembly 18 rotates the electrode can be shortened at the grinding wheel assembly by cutting the worn out electrode end or the newly ground electrode side.

A bore hole 60 is provided in the housing 16. A screw 62 (FIG. 1) extends through the bore hole 60 which is used to screw the housing 16 to the motor flange 14. The screw 62 is screwed into a nut 72 which is provided in a recess 74 in the motor flange 14. With such an assembly the housing 16 is screwed to the motor flange 14 with only one screw 62 so that it does not shift. This enables a particularly simple and quick disassembling and assembling if a grinding wheel shall be exchanged. A shaft 30 with a particularly short neck 28 can be used with the present assembly.

The housing 16 and the motor flange 14 comprise a group 76 and 78 of bore holes. The bore holes each extend from the circumference of the housing in the direction of the grinding wheel which is the closest to the housing or motor flange, respectively. Each group comprises a plurality of bore holes 82 (also called openings) having different diameters which is indicated above the bore hole by an engraving. The angle between an electrode inserted in a bore hole 82 or opening and the grinding wheel is the same for each bore hole of a group. The bore hole 82, for example, has a diameter of 1.6 mm and a grinding angle of 22.5 degrees. It is indicated by an engraving above the first engraving for the respective group. According to the present embodiment there are different angles possible for one grinding. Electrodes having different diameters may be used. The electrode is guided by the bore hole 82 so well that reproducible results will be achieved with ease and without any risk.

Further grinding angles, further electrode diameters or the use of a grinding surface with a different grain size can be considered by providing bore holes above or below the plane 19. An electrode can, for example, be roughly ground at first by inserting it into the bore hole 82 in the housing 16. A rough grain size is provided for the grinding wheel 22 having a grinding surface facing downwards. A bore hole 90 above the plane 19 is used for fine grinding. The corresponding grinding wheel 20 having a grinding surface facing upwards has a fine grain size.

The housing 16 has a further group 92 of bore holes extending perpendicular from the upper side to the underside of the housing 16. The bore holes of this group also have different diameters corresponding to the diameters of the other groups. The bore holes of the group 92 enable the perpendicular grinding of electrode tips.

The entire assembly is screwed onto a handheld device. The grinding wheel assembly is positioned right before the ball bearing of the motor shaft 30. This avoids unbalancing with high rotational speed.

A cover 61 is rotatably mounted around the housing portion 16. The cover 61 is provided with a slit 63 which can be positioned in the range of the desired bore hole 82. The cover 61 is connected to a suction device. In such a way no grinding dust can exit the assembly.

The assembly is short, easy to handle and requires only very few components. It is, therefore, inexpensive regarding transport, storage and production.

If a bore hole has defects the screw 62 is released and the housing portion 16 removed and exchanged or serviced. The ball bearing and the shaft 30 inside the motor flange 14 remain untouched.

The housing portion 16 is provided with bore holes in two planes which extend above and below the plane 19 with the grinding wheel assembly. Contrary to known assemblies the grinding wheel assembly runs not in the connection range between two housing portions but inside one of the housing portions.

Instead of using two separate grinding wheels, one grinding wheel with two grinding surfaces may be used. The housing portion has at least one bore hole in the side facing the motor and one bore hole in the side remote from the motor for the use with only one grinding wheel. Thereby, the grinding wheel can be simultaneously used from above and from below as in the above described embodiment. This is a second variation where the bore holes of the two planes are closer to each other in order to hit the grinding wheel plane of a grinding wheel from above and from below.

It is understood that the invention may also be used in assemblies with only one grinding surface. In this case the grinding wheel preferably runs in the end range of the housing portion 16 to achieve a short length of the assembly. The bore holes are then provided on the side of the grinding wheel facing the motor and the grinding surface faces the motor.

The assembly is a hand-held device. It may, however, be fixed with a holder 64 to a work bench or a bench vise.

The invention claimed is:

1. A device for processing welding electrodes comprising: a driving motor and a shaft connected to said driving motor; a motor flange for bearing said shaft, said motor flange having a side facing said motor and a side remote from said motor;
a housing with a circumference; and
a grinding surface in said housing, said grinding surface facing said motor and said driving motor driving said grinding surface with said shaft whereby said grinding surface rotates in said housing about a rotational axis, wherein at least one opening is provided in said housing for guiding a welding electrode for grinding in a defined position relative to said grinding surface, said housing is releasably fixed to said motor flange, and said grinding surface is arranged on a side of said motor flange remote from said motor, and wherein said motor flange comprises a sleeve with a smaller diameter than the housing, and said housing fixed to said motor flange in such a way, that the housing is shifted over said sleeve whereby at least one of said openings extends from said circumference of said housing towards said grinding surface facing said motor and the housing extends over the motor flange whereby the motor flange is inserted into an inner space of the housing to substantially reduce a length of the device.

2. The device of claim 1, wherein a further grinding surface runs in said housing, which is directed to the side remote from said motor, and said housing comprises at least one further opening extending from said circumference of said housing towards said further grinding surface directed to said side remote from said motor.

3. The device of claim 2, wherein said grinding surfaces form opposite sides of one grinding wheel or are provided on different grinding wheels rotating about said rotational axis and directed in opposite directions.

4. The device of claim 1, wherein said housing is fixed to said sleeve in different lateral positions relative to said rotational axis of the shaft.

5. The device of claim 1, wherein a protective cover with a suction device is provided for fixing to said housing.

6. The device of claim 5, wherein said position of said protective cover is adapted to the lateral position of said housing.

7. The device of claim 1, further comprising an angular fitting for fixing said device to a table or a bench vise.

\* \* \* \* \*